No. 781,469. PATENTED JAN. 31, 1905.
J. H. SMITH.
PHOTOGRAPHIC PLATE OR FILM.
APPLICATION FILED SEPT. 13, 1904.
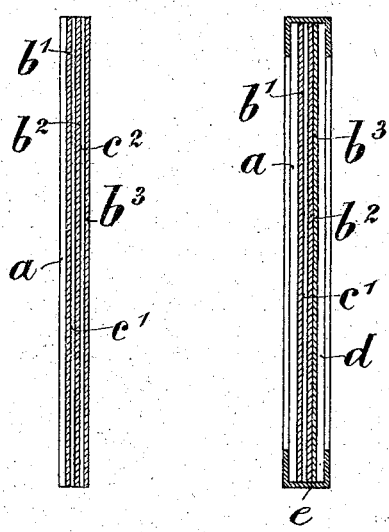

No. 781,469.

Patented January 31, 1905.

UNITED STATES PATENT OFFICE.

JOHN HENRY SMITH, OF ZURICH, SWITZERLAND.

PHOTOGRAPHIC PLATE OR FILM.

SPECIFICATION forming part of Letters Patent No. 781,469, dated January 31, 1905.

Application filed September 13, 1904. Serial No. 224,312.

*To all whom it may concern:*

Be it known that I, JOHN HENRY SMITH, a subject of the King of Great Britain, residing in Zurich, in the Canton of Zurich, Republic of Switzerland, (whose post-office address is No. 417 Seestrasse, Zurich,) have invented certain new and useful Improvements in Photographic Plates or Films; and I do hereby declare the following to be a full, clear, and exact description of the invention, such as will enable others skilled in the art to which it appertains to make and use the same.

I have applied for patent in Germany on September 17, 1903.

The combination of two photographic plates laid face to face in the camera for the purpose of obtaining in one exposure two negatives suitable for the preparation of two-color photographs is described in Gurtner's German Patent No. 146,150, of July 1, 1902. The subject of my Swiss Patent No. 29,446, of August 26, 1903, is a compound plate consisting of two photographic plates placed face to face with a thin transparent sensitive film inserted between them for the purpose of obtaining in one exposure three negatives suitable for the production of three-color photographs. Both of these inventions are of practical application, although not free from certain disadvantages. If two glass plates are employed, which is the simplest construction, it is necessary in order to have sharp negatives to use expensive plate-glass, as otherwise, and particularly with large sizes, there would be no certainty that the surfaces would be in contact throughout. Should blemishes, such as small air-bells or impurities, occur at the back of the front plate, these will be transmitted to the first negative, because the light in passing to the sensitive surface must first traverse the glass. A further disadvantage is that the glass of the front plate absorbs some light, rendering necessary an increased exposure. All these disadvantages are overcome in the case of the present invention, where two or more sensitive layers are coated upon a single support—such as glass, celluloid, paper, &c.—and between each two adjacent sensitive films a thin transparent neutral film, such as collodion or celluloid, is coated in order to allow of the subsequent separation of the sensitive films.

Plates with several superposed sensitive surfaces coated upon them are not in themselves new, such plates having been employed for the prevention of halation during exposure. The sensitive surfaces were, however, in that case directly superposed without the introduction of a separating medium, as a subsequent separation of the sensitive films was never intended.

The accompanying drawings show two examples of the subject of this invention as applied to three-color photography and employing gelatin dry-plates.

In Figure I, $a$ is the glass support, $b'$ the first, $b^2$ the second, and $b^3$ the third, sensitive surface, obtained by coating three gelatino-argentic emulsions of suitable color sensitiveness and general sensitiveness. Between $b'$ and $b^2$, as well as between $b^2$ and $b^3$, a neutral transparent collodion film $c'$ and $c^2$ is coated. If necessary, the separating neutral films may be colored in order to act as light-filters to the underlying sensitive films.

In the modification shown in Fig. II the glass plate $a$ is the support for the two sensitive films $b'$ and $b^2$, brought into intimate combination by the transparent neutral film $c'$, while the third sensitive film $b^3$, supported upon a glass plate $d$ as an ordinary dry-plate, is placed upon the middle film and kept loosely in contact with the compound plate by external means—*e. g.*, a binding-strip of paper $e$.

After the exposure has been made the upper sensitive films are separated and transferred to an adhesive surface—*e. g.*, a glass plate with a gelatin surface—upon which they are developed and further manipulated as the color process in question requires. In order to obtain a more certain separation of the sensitive surfaces with their underlying neutral films, an adhesive solution or substratum may be applied to the collodion film underlying the sensitive film, as is usual in the ordinary manufacture of dry-plates. In practice it is preferable and much simpler to separate the sensitive films from their underlying collodion or celluloid films, in which case the substratum should be omitted. In order to separate the upper sensitive films when the support is a glass plate, it is advisable to employ a flexible non-expanding cloth or paper, &c., coated with a suitable adhesive material. After the compound film has been cut through along the edges the adhesive cloth is squeegeed onto the surface of the plate, a corner of the upper sensitive film lifted with a penknife, and the film carefully stripped off the plate. The film is then squeegeed onto its permanent support—e. g., a glass plate with a moist gelatin surface—and allowed to dry, with the adhesive cloth still in contact. After drying the adhesive cloth is easily stripped off, the sensitive film forming with the gelatin surface of the plate an intimate combination, enabling the plate to pass through all the ordinary photographic baths without the slightest expansion or frilling. The remaining sensitive films, with the exception of the last one, together with their overlying collodion or celluloid films, are stripped off by means of the adhesive cloth and squeegeed direct onto the gelatin surface of the glass plate. After drying and removal of the adhesive cloth the overlying collodion film is removed by dissolving in a suitable solution— e. g., methyl alcohol—in order to allow of the subsequent development of the plate. The last sensitive film need not be removed from its support as long as the latter consists of a transparent material; but the overlying collodion film should be removed in the manner described before developing. Should the common support consist of paper or other opaque substance, the last sensitive film may be transferred to a permanent transparent support in the same manner as described if the paper receives a coating of gelatin, followed by a coating of collodion, before the sensitive films are superposed to assist the transference. If desired, the upper sensitive film after being lifted from the plate may be squeegeed to a second adhesive cloth before transferring to its permanent support in order to reverse the negative.

What I claim is—

1. As a new article of manufacture a compound photographic plate or film consisting of a single support upon which are coated two or more layers of sensitive photographic material, each two adjoining layers being separated by a coating of neutral transparent material for the purpose of subsequently separating the sensitive layers.

2. As a new article of manufacture a compound photographic plate or film consisting of a single support upon which are coated two or more layers of sensitive photographic material, each two adjoining layers being separated by a coating of neutral transparent material for the purpose of subsequently separating the sensitive layers, in combination with an ordinary single-film photographic plate or film placed face to face and loosely bound together substantially as described.

3. As a new article of manufacture a compound photographic plate or film consisting of a single support upon which are coated two or more layers of sensitive photographic material, each two adjoining layers being separated by a coating of neutral transparent material for the purpose of subsequently separating the sensitive layers, one or more of the neutral separating layers being colored in order to act as color-filter to the underlying sensitive layer or layers, substantially as described.

4. As a new article of manufacture a compound photographic plate or film consisting of a single support upon which are coated two or more layers of gelatino-argentic emulsion, each two adjoining layers being separated by a coating of collodion or celluloid for the purpose of subsequently separating the emulsion layers, substantially as described.

5. As a new article of manufacture a compound photographic plate or film consisting of a single support upon which are coated three layers of sensitive gelatino-argentic emulsion each two adjoining layers being separated by a coating of celluloid or collodion for the purpose of subsequently separating the sensitive layers, the sensitive layers being so adjusted in respect of general and color sensitiveness and the adjustment assisted if necessary by the coloration of the collodion films so that upon correctly exposing the compound plate upon a suitable subject, separating the sensitive layers as described, and developing them upon their new supports three negatives are obtained suitable for the production of three-colored photographs, substantially as described.

In testimony whereof I have signed my name to this specification in the presence of two subscribing witnesses.

JOHN HENRY SMITH.

Witnesses:
HERMANN HUBER,
JOSEPH SIMON.